(12) United States Patent
Wang et al.

(10) Patent No.: US 7,019,058 B2
(45) Date of Patent: *Mar. 28, 2006

(54) HALOGENATED ELASTOMERIC COMPOSITIONS HAVING ENHANCED VISCOSITY

(75) Inventors: Hsien-Chang Wang, Bellaire, TX (US); Andy H. Tsou, Houston, TX (US); Ilan Duvdevani, Houston, TX (US); Michael K. Lyon, Houston, TX (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 421 days.

This patent is subject to a terminal disclaimer.

(21) Appl. No.: 10/398,256

(22) PCT Filed: Oct. 9, 2001

(86) PCT No.: PCT/US01/31522

§ 371 (c)(1),
(2), (4) Date: Apr. 3, 2003

(87) PCT Pub. No.: WO02/31049

PCT Pub. Date: Apr. 18, 2002

(65) Prior Publication Data

US 2004/0063823 A1    Apr. 1, 2004

Related U.S. Application Data

(63) Continuation-in-part of application No. 09/686,215, filed on Oct. 11, 2000, now Pat. No. 6,552,108.

(60) Provisional application No. 60/296,698, filed on Jun. 7, 2001.

(51) Int. Cl.
*C08K 5/50* (2006.01)

(52) U.S. Cl. ............... 524/154; 524/236; 524/251; 524/515; 524/528; 525/50; 525/61; 525/235; 525/241

(58) Field of Classification Search .......... 524/154, 524/236, 251, 515, 528; 525/50, 61, 235, 525/241

See application file for complete search history.

(56) References Cited

U.S. PATENT DOCUMENTS

| | | | |
|---|---|---|---|
| 2,631,984 A | 3/1953 | Crawford et al. | |
| 2,732,354 A | 1/1956 | Morrissey et al. | |
| 2,944,578 A | 7/1960 | Baldwin et al. | |
| 2,964,489 A | 12/1960 | Baldwin et al. | |
| 3,011,996 A | 12/1961 | Kuntz et al. | |
| 3,037,954 A | 6/1962 | Gessler et al. | |
| 3,099,644 A | 7/1963 | Parker et al. | |
| 3,898,253 A | 8/1975 | Buckler et al. | |
| 3,969,330 A | 7/1976 | Lasis et al. | |
| 4,130,534 A | 12/1978 | Coran et al. | |
| 4,130,535 A | 12/1978 | Coran et al. | |
| 4,256,857 A | 3/1981 | Buckler et al. | |
| 4,454,304 A | 6/1984 | Tsai | |
| 4,594,390 A | 6/1986 | Abdou-Sabet et al. | |
| 4,921,910 A | 5/1990 | Lunt et al. | |
| 5,013,793 A * | 5/1991 | Wang et al. | 525/195 |
| 5,021,500 A | 6/1991 | Puydak et al. | |
| 5,043,392 A | 8/1991 | Lunt et al. | |
| 5,051,477 A | 9/1991 | Yu et al. | |
| 5,073,597 A | 12/1991 | Puydak et al. | |
| 5,162,445 A | 11/1992 | Powers et al. | |
| 5,177,147 A | 1/1993 | Spenadel et al. | |
| 5,290,886 A | 3/1994 | Ellul | |
| 5,386,864 A | 2/1995 | Costemalle et al. | |
| 5,428,099 A | 6/1995 | Morrar et al. | |
| 5,597,866 A | 1/1997 | White et al. | |
| 5,654,379 A | 8/1997 | Powers et al. | |
| 5,910,543 A | 6/1999 | Patel et al. | |
| 5,959,049 A | 9/1999 | Powers et al. | |
| 6,060,563 A | 5/2000 | Peiffer et al. | |

FOREIGN PATENT DOCUMENTS

| | | |
|---|---|---|
| EP | 0 474 926 | 3/1992 |
| WO | WO 92/02582 | 2/1992 |
| WO | WO 94/10214 | 5/1994 |
| WO | WO 97/02320 | 1/1997 |
| WO | WO 98/52994 | 11/1998 |

OTHER PUBLICATIONS

Tony Whelan, MSC, "*Polymer Technology Dictionary,*" Chapman & Hall, p. 175 (1994).

Martin Van Duin and Aniko Souphanthong, "*The Chemistry of Phenol-Formaldehyde Resin Vulcanization of EPDM: Part I. Evidence for Methylene Crosslinks,*" Rubber Chemistry and Technology, vol. 68, pp. 717–727 (1995).

* cited by examiner

*Primary Examiner*—Peter D. Mulcahy
(74) *Attorney, Agent, or Firm*—Kevin M. Faulkner; Leandro Arechederra

(57) ABSTRACT

The invention provides a method for increasing the viscosity of $C_4$–$C_7$ isoolefin copolymers including halomethylstyrene derived units by mixing the copolymer with a hindered amine or phosphine of the structure $R_1 R_2 R_3 N$ or $R_1 R_2 R_3 P$ wherein $R_1$, $R_2$ and $R_3$ are preferably lower and higher alkyl groups. The resulting ionically associated, amino or phosphine modified elastomers are used to prepare thermoplastic elastomer blend compositions, including dynamically vulcanized compositions, containing more finely dispersed elastomers which results in compositions having improved mechanical properties.

20 Claims, No Drawings

HALOGENATED ELASTOMERIC COMPOSITIONS HAVING ENHANCED VISCOSITY

CROSS REFERENCE TO RELATED APPLICATIONS

This application claims priority to U.S. application Ser. No. 09/686,215, filed Oct. 11, 2000, now U.S. Pat. No. 6,552,108, and the benefit of Provisional application No. 60/296,698, filed Jun. 7, 2001, herein incorporated by reference in their entireties.

FIELD OF THE INVENTION

The present invention relates to halogenated elastomers having enhanced viscosity. These enhanced viscosity compositions comprise blends of an isoolefin copolymer comprising at least a halomethylstyrene derived unit and at least one amine or phosphine.

BACKGROUND

A thermoplastic elastomer is generally defined as a polymer or blend of polymers that can be processed and recycled in the same way as a conventional thermoplastic materials, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

Polymer blends which have a combination of both thermoplastic and elastic properties are generally obtained by combining a thermoplastic polymer with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisoprene in an uncured matrix of thermoplastic polymer such as polypropylene.

Depending on the ultimate application, such thermoplastic elastomer (TPE) compositions may comprise one or a mixture of thermoplastic materials such as propylene homopolymers and propylene copolymers and like thermoplastics used in combination with one or a mixture of cured or non-cured elastomers such as ethylene/propylene rubber, EPDM rubber, diolefin rubber, butyl rubber or similar elastomers. TPE compositions may also be prepared where the thermoplastic material used is an engineering resin having good high temperature properties, such as a polyamide or a polyester, used in combination with a cured or non-cured elastomer. Examples of such TPE compositions and methods of processing such compositions, including methods of dynamic vulcanization, may be found in U.S. Pat. Nos. 4,130,534, 4,130,535, 4,594,390, 5,021,500, 5,177,147 and 5,290,886, as well as in WO 92/02582.

Particularly preferred elastomeric polymers useful for preparing TPE compositions are halogenated random isoolefin copolymers comprising at least halomethylstyrene derived units. Halogenated elastomeric copolymers of this type (referred to as BIMS polymers) and their method of preparation are disclosed in U.S. Pat. No. 5,162,445. Curable TPE compositions containing these copolymers are described in U.S. Pat. Nos. 5,013,793 and 5,051,477, among others.

TPE compositions are normally prepared by melt mixing or melt processing the thermoplastic and elastomeric components at temperatures in excess of 150° C. and under high shear mixing conditions (shear rate greater than 100 l/sec or $sec^{-1}$) in order to achieve a fine dispersion of one polymer system within a matrix of the other polymer system. The finer the dispersion, the better are the mechanical properties of the TPE product.

Due to the flow activation and shear thinning characteristic inherent in such BIMS polymers, reductions in viscosity values of these polymers at increased temperatures and shear rates encountered during mixing are much more pronounced than reductions in viscosity of the thermoplastic component with which the BIMS polymer is blended. However, minimization of the viscosity differential between the BIMS and thermoplastic components during mixing and/or processing is essential for the provision of uniform mixing and fine blend morphology that are critical for good blend mechanical properties.

SUMMARY OF THE INVENTION

The invention provides a composition, preferably a thermoplastic composition, comprising a halogenated elastomer and a viscosity enhancing agent such as a hindered amine or phosphine. In one embodiment of the invention, the halogenated elastomer is a $C_4$ to $C_7$ isomonoolefin copolymer comprising halomethylstyrene derived units. The copolymer is mixed with at least one hindered amine or phosphine compound having the respective structure $(R_1 R_2 R_3)N$ or $(R_1 R_2 R_3)P$ wherein $R_1$ is H or $C_1$ to $C_6$ alkyl, $R_2$ is $C_1$ to $C_{30}$ alkyl and $R_3$ is $C_4$ to $C_{30}$ alkyl and further wherein $R_3$ is a higher alkyl than $R_1$, said mixing being accomplished at a temperature above the melting point of said hindered amine or phosphine compound. The mixing is preferably done in such a manner to create a homogeneous blend.

The invention further provides a process for increasing the viscosity of a $C_4$ to $C_7$ isomonoolefin copolymer comprising mixing the copolymer with a hindered amine or phosphine compound.

The invention provides a new approach towards viscosity enhancement of BIMS copolymers such that their viscosity during high shear thermal mixing more closely approaches or matches the viscosity of thermoplastic materials with which they are blended, thereby facilitating more uniform mixing and the development of a finer dispersion of one polymer system within the other matrix polymer system.

DETAILED DESCRIPTION

As used herein, the term "dynamic vulcanization" means a vulcanization or curing process for a rubber contained in a thermoplastic elastomer composition, wherein the rubber is vulcanized under conditions of high shear at a temperature above the melting point of the component thermoplastic. The rubber is thus simultaneously crosslinked and dispersed as fine particles within the thermoplastic matrix, although as noted above other morphologies may also exist.

As used herein, the term "vulcanized" means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081.

As used herein, the term "composition" includes blends of the halogenation product of random copolymers of a $C_4$ to $C_7$ isomonoolefin, such as isobutylene, and an alkylstyrene comonomer, and the agent used to influence the viscosity, such as an amine or phosphine. The composition may also include other components.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer", as used herein, refers to any polymer or composition of polymers consistent with the ASTM D1566 definition. The term "elastomer" may be used interchangeably with the term "rubber", as used herein.

Isoolefin Copolymer Comprising a Halomethylstyrene Derived Unit

Compositions of the present invention include at least one halogenated elastomer. The halogenated elastomer in one embodiment of the invention is a random copolymer of comprising at least $C_4$ to $C_7$ isoolefin derived units, such as isobutylene derived units, and halomethylstyrene derived units. The halomethylstyrene unit may be an ortho-, meta-, or para-alkyl-substituted styrene unit. In one embodiment, the halomethylstyrene derived unit is a p-halomethylstyrene containing at least 80%, more preferably at least 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin copolymer may also include other monomer derived units. The isoolefin of the copolymer may be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer may also further comprise multiolefin derived units. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Desirable styrenic monomer derived units that may comprise the copolymer include styrene, methylstyrene, chlorostyrene, methoxystyrene, indene and indene derivatives, and combinations thereof.

In another embodiment of the invention, the interpolymer is a random elastomeric copolymer of an ethylene derived unit or a $C_3$ to $C_6$ α-olefin derived unit and an halomethylstyrene derived unit, preferably p-halomethylstyrene containing at least 80%, more preferably at least 90% by weight of the para-isomer and also include functionalized interpolymers wherein at least some of the alkyl substituents groups present in the styrene monomer units contain benzylic halogen or some other functional group.

Preferred isoolefin copolymers may be characterized as interpolymers containing the following monomer units randomly spaced along the polymer chain:

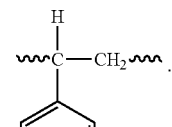

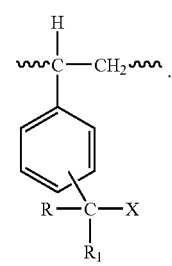

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably para. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Most useful of such functionalized materials are elastomeric random interpolymers of isobutylene and p-methylstyrene containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The copolymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional derived unit.

Preferred halogenated poly(isobutylene-co-p-methylstyrene) are brominated polymers which generally contain from 0.1 to 5 wt % of bromomethyl groups. In yet another embodiment, the amount of bromomethyl groups is from 0.2 to 2.5 wt %. Expressed another way, preferred copolymers contain from 0.05 up to 2.5 mole % of bromine, based on the weight of the polymer, more preferably from 0.1 to 1.25 mole % bromine, and are substantially free of ring halogen or halogen in the polymer backbone chain. In one embodiment of the invention, the interpolymer is a copolymer of $C_4$ to $C_7$ isomonoolefin derived units, a p-methylstyrene derived units and a p-halomethylstyrene derived units, wherein the p-halomethylstyrene units are present in the interpolymer from 0.4 to 1 mol % based on the interpolymer. In another embodiment, the p-halomethylstyrene is p-bromomethylstyrene. The Mooney Viscosity (1+8, 125° C., ASTM D1646, modified) is from 30 to 60 MU.

Amine/phosphine Component

Viscosity enhancement of the BIMS copolymers is achieved by mixing the BIMS copolymer with the appropriate hindered amine or phosphine compounds (or "viscosity enhancers") under conditions of shear and at temperatures above the melting point of the amine or phosphine for a period of time sufficient to allow the amine or phosphine to become uniformly dispersed within the BIMS material, usually 1 to 10 minutes and at preferred temperatures in the range of 100 to 180° C.

Suitable preferred viscosity enhancers which may be used include those described by the formula $(R_1 R_2 R_3)Q$, wherein Q is a Group 15 element, preferably nitrogen or phosphorous, and wherein $R_3$ is a $C_{10}$ to $C_{20}$ alkyl and $R_1$ and $R_2$ are the same or different lower alkyls, more preferably $C_1$ to $C_6$ alkyls. Preferred are hindered amine/phosphine compounds which may be used include those tertiary amines of the above formula $(R_1 R_2 R_3)N$. Especially preferred amines are decyldimethyl amine, hexadecyldimethylamine, hydrogenated tallowalkyl dimethyamine, dihydrogenated tallowalkylmethyl amine and like compounds.

Preferred hindered phosphine compounds of the formula $(R_1 R_2 R_3)P$ are also those wherein $R_3$ is $C_{10}$ to $C_{20}$ alkyl and $R_1$ and $R_2$ are the same or different lower alkyls, more preferably $C_1$ to $C_6$ alkyls. These phosphines are analogous to the amines listed above.

The quantity of amine or phosphine incorporated into the BIMS copolymer should be sufficient such that the viscosity of the composition is enhanced (increased at a given shear rate and temperature). The resultant composition may be referred to variously as the "amine or phosphine/copolymer" composition, or the "viscosity enhancer/copolymer" composition, or the "amine or phosphine/BIMS" composition. In one embodiment, the viscosity value of the viscosity enhancer/BIMS composition is greater than 1300 at 220° C. and 100 l/s shear rate, and in another embodiment the value is from 1300 to 6000 Pa·s at 220° C. and 100 l/s shear rate, and from 1400 to 5000 Pa·s at 220° C. and 100 l/s shear rate in another embodiment. In another embodiment, the viscosity value of the viscosity enhancer/BIMS composition is greater than 200 at 220° C. and 1000 l/s shear rate, and in another embodiment the value is from 200 to 600 Pa·s at 220° C. and 1000 l/s shear rate, and from 220 to 550 Pa·s at 220° C. and 1000 l/s shear rate in another embodiment. Generally, from 0.05 to 2 mole equivalents, more preferably from 0.1 to 1 mole equivalents, of amine or phosphine per halogen of BIMS is sufficient.

The viscosity enhancer/BIMS composition, an amine/BIMS in one embodiment, of the present invention is produced substantially in the absence of a solvent. More particularly, the amine and BIMS components are blended by techniques known to those skilled in the art without the addition of an organic solvent. Solvents, especially organic solvents, are substantially absent in the composition, or during blending of the components. By "substantially absent", it is meant that there is less than 5 wt % solvent by weight of the entire composition present, and less than 2 wt % in another embodiment.

The modified BIMS polymers of this invention are to be distinguished from the ionomers disclosed in U.S. Pat. No. 5,162,445 or WO9410214. The materials produced in these references involve nucleophilic substitution reactions conducted in organic solvent wherein benzylic halogen present in the BIMS polymer is displaced thereby converting the polymer to an ionomer with ionic amine or phosphine functionality. Materials produced in accordance with this invention are believed to be ionically associated polymer chains with no halogen displacement in the polymer chains. This ionic association provides a modified polymer having increased viscosity as compared with the starting BIMS polymer.

Thermoplastic Polymers

The enhanced viscosity isoolefin copolymer of the invention is useful in blending with thermoplastics. Thermoplastic polymers suitable for use in the present invention include amorphous, partially crystalline or essentially totally crystalline polymers selected from polyolefins, polyamides, polyimides, polyesters, polycarbonates, polysulfones, polylactones, polyacetals, acrylonitrile/butadiene/styrene copolymer resins, polyphenylene oxides, ethylene-carbon monoxide copolymers, polyphenylene sulfides, polystyrene, styrene/acrylonitrile copolymer resins, styrene/maleic anhydride copolymer resins, aromatic polyketones and mixtures thereof. These and other thermoplastics are disclosed in, for example, U.S. Pat. No. 6,013,727.

Polyolefins suitable for use in the compositions of the invention include thermoplastic, at least partially crystalline polyolefin homopolymers and copolymers, including polymers prepared using Ziegler/Natta type catalysts or single sight catalysts such as metallocene catalysts. They are desirably prepared from monoolefin monomers having 2 to 6 carbon atoms, such as ethylene, propylene, 1-butene, isobutylene, 1-pentene, copolymers containing these monomers, and the like, with propylene being the preferred monomer. As used in the specification and claims, the term polypropylene includes homopolymers of propylene as well as reactor copolymers of propylene which can contain 1 to 20 wt % of ethylene or an alpha-olefin comonomer of 4 to 16 carbon atoms or mixtures thereof. The polypropylene can be highly crystalline isotactic or syndiotactic polypropylene, usually having a narrow range of glass transition temperature (Tg). Commercially available polyolefins may be used in the practice of the invention.

The term "polypropylene" includes homopolymers of propylene as well as reactor copolymer of polypropylene which can contain from 1 to 20 wt % ethylene derived units or other 4 to 6 carbon α-olefin comonomer derived units. The polypropylene can be highly crystalline isotactic or syndiotactic polypropylene. The reactor copolymer can be either random or block copolymer. Other suitable thermoplastic polyolefin resins include high density polyethylene (HDPE), low density polyethylene (LDPE), linear low density polyethylene (LLDPE), very low density polyethylene (VLDPE), ethylene copolymer resins, plastomeric copolymers of ethylene and 1-alkene, polybutene, and their mixtures.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidinone, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyl-eneadipamide (nylon-6,6), polyhexamethyleneazelamide (nylon-6,9), polyhexamethylenesebacamide (nylon-6,10), polyhexamethyleneisophthalamide (nylon-6,IP) and the condensation product of 11-amino-undecanoic acid (nylon-11). Commercially available thermoplastic polyamides may be advantageously used in the practice of this invention, with linear crystalline polyamides having a softening point or melting point between 160° C.–230° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly(trans-1,4-cyclohexylene), poly($C_2$ to $C_6$ alkane biscarboxylates) such as poly(trans-1,4-cyclohexylene succinate) and poly(trans-1,4-cyclohexylene adipate); poly(cis- or trans-1,4-cyclohexanedimethylene)alkanedicarboxylates such as poly(cis-1,4-cyclohexane-di-methylene)oxlate and poly(cis-1,4-cyclohexane-di-methylene)succinate, poly($C_2$ to $C_4$ alkylene terephthalates) such as polyethylene terephthalate and polytetramethylene-terephthalate, poly($C_2$ to $C_4$ alkylene isophthalates) such as polyethyleneisophthalate and polytetramethylene-isophthalate and like materials. Preferred polyester are derived from aromatic dicarboxylic acids such as naphthalenic or ophthalmic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic engineering resins which may be used in accordance with this invention are well known, commercially available materials produced by the oxidative coupling polymerization of alkyl substituted phenols. They are generally linear polymers having a glass transition temperature in the range of 190° C. to 235° C. Examples of preferred PPE polymers include poly(2,6-dialkyl-1,4-phenylene ethers) such as poly(2,6-dimethyl-1, 4-phenylene ether), poly(2-methyl-6-ethyl-1,4-phenylene ether), poly(2,6-dipropyl-1,4-phenylene ether) and poly(2-ethyl-6-propyl-1,4-phenylene ether). These polymers, their method of preparation and blends with polystyrene are further described in U.S. Pat. No. 3,383,435.

Other thermoplastic resins which may be used include the polycarbonate analogs of the polyesters described above such as segmented poly(ether co-phthalates); polycaprolactone polymers; styrene resins such as copolymers of styrene with less than 50 mole % of acrylonitrile (SAN) and resinous copolymers of styrene, acrylonitrile and butadiene (ABS); sulfone polymers such as polyphenyl sulfone and like engineering resins as are known in the art.

Additives

The compositions of the invention may include plasticizers, curatives and may also include reinforcing and non-reinforcing fillers, antioxidants, stabilizers, rubber processing oil, plasticizers, extender oils, lubricants, antiblocking agents, anti-static agents, waxes, foaming agents, pigments, flame retardants and other processing aids known in the rubber compounding art. Such additives can comprise up to 50 wt % of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions, but are preferably paraffinic. The type will be that ordinarily used in conjunction with the specific rubber or rubbers present in the composition, and the quantity based on the total rubber content may range from zero up to 1–200 parts by weight per hundred rubber (phr). Plasticizers such as trimellitate esters may also be present in the composition.

Moreover, various phenolic resins known to the art and to the literature can be utilized, as well as various phenol-formaldehyde resins as set forth in "The Chemistry of Phenol-Formaldehyde Resin Vulcanization of EPDM: Part I. Evidence for Methylene Crosslinks," by *Martin Van Duin and Aniko Souphanthong*, 68 RUBBER CHEMISTRY AND TECHNOLOGY 717–727 (1995).

The cure agent of the present invention may include any number of components such as a metal or metal ligand complex, accelerators, resins or other components known in the art to affect a cure of an elastomer. In its broadest embodiment, the cure agent is at least a Group 2–14 metal oxide or metal ligand complex, wherein at least one ligand is able to undergo a substitution reaction with the inducer compound. In one embodiment, the at least one cure agent is a metal oxide which includes zinc oxide, hydrated lime, magnesium oxide, alkali carbonates, and hydroxides. In particular, the following metal-based cure agents are common curatives that will function in the present invention: ZnO, CaO, MgO, $Al_2O_3$, $CrO_3$, FeO, $Fe_2O_3$, and NiO, and/or carboxylates of these metals. These metal oxides can be used in conjunction with the corresponding metal carboxylate complex, or with the carboxylate ligand, and either a sulfur compound or an alkylperoxide compound. (See also, *Formulation Design and Curing Characteristics of NBR Mixes for Seals,* RUBBER WORLD 25–30 (1993).

The amount of the curing agent will generally vary depending upon the type utilized and especially the desired degree of cure, as is well recognized in the art. For example, the amount of sulfur is generally from 1 to 5, and preferably from 2 to 3 parts by weight per 100 parts by weight of the composition. The amount of the peroxide curing agent is generally from 0.1 to 2.0 parts by weight, the amount of the phenolic curing resin is generally from 2 to 10 parts by weight, and the amount of the hindered amine is from 0.1 to 2 parts by weight, all based upon 100 parts by weight of the composition.

These metal oxides can be used in combination with another compound such as a fatty acid, and the cure agent is not herein limited to the metal oxide or metal ligand complex alone. Examples of organic or fatty acids that can be used in the invention are stearic, oleic, lauric, palmitic, myristic acids, and mixtures thereof, and hydrogenated oils from palm, castor, fish, and linseed oils. The use of these cure agents is discussed in RUBBER TECHNOLOGY 20–58 (Maurice Mortin, ed., Chapman & Hall 1995), and in *Rubber World Magazine's* BLUE BOOK 2001 109–137 (Don R. Smith, ed., Lippincott & Peto, Inc. 2001); and U.S. Pat. No. 5,332,787.

In one embodiment of the invention, curatives may be present from 0.5 to 20 phr of the composition, and from 1 to 10 phr in another embodiment. In another embodiment, curatives are substantially absent from the composition. By "substantially absent", it is meant that traditional curatives such as phenolic resins, sulfur, peroxides, metals and metal oxides, and metal-ligand complexes are not present in the composition.

Processing

The BIMS component of the thermoplastic elastomer is generally present as small, i.e., micro-size, particles within a continuous plastic matrix, although a co-continuous morphology or a phase inversion is also possible depending on the amount of rubber relative to plastic, and the cure system or degree of cure of the rubber. The rubber is desirably at least partially crosslinked, and preferably is completely or fully cross-linked in the final vulcanized thermoplastic composition. The partial or complete crosslinking can be achieved by adding an appropriate rubber curative to the blend of thermoplastic polymer and rubber and vulcanizing the rubber to the desired degree under conventional vulcanizing conditions. However, it is preferred that the rubber be crosslinked by the process of dynamic vulcanization.

Dynamic vulcanization is effected by mixing the thermoplastic elastomer components at elevated temperature in conventional mixing equipment such as roll mills, Banbury™ mixers, Brabender™ mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

Those ordinarily skilled in the art will appreciate the appropriate quantities, types of cure systems and vulcanization conditions required to carry out the vulcanization of the BIMS rubber. The rubber can be vulcanized using varying amounts of curative, varying temperatures and varying time of cure in order to obtain the optimum crosslinking desired. Any known cure system for the rubber can be used, so long as it is suitable under the vulcanization conditions with the specific BIMS rubber being used and with the thermoplastic component. These curatives include sulfur, sulfur donors, metal oxides, resin systems, peroxide-based systems, hydrosilation curatives, containing platinum or peroxide catalysts, and the like, both with and without accelerators and co-agents. Such cure systems are well known in the art and literature of vulcanization of elastomers.

Depending upon the desired applications, the amount of rubber present in the composition may range from 10 to 90 wt % of the total polymer content of the composition. In most applications and particularly where the rubber component is dynamically vulcanized, the rubber component will constitute less than 70 wt %, more preferably less than 50 wt %, and most preferably 10–40 wt % of the total polymer content of the composition.

Melt processing temperatures of the TPE compositions will generally range from above the melting point of the highest melting polymer present in the TPE composition up to 300° C. Preferred processing temperatures will range from 140° C. up to 260° C., from 150° C. up to 240° C. in another embodiment, and from 170° C. to 220° C. in yet another embodiment.

The hindered amine or phosphine compound may be combined with the BIMS rubber component at any mixing stage, i.e., when the BIMS and thermoplastic polymer are initially mixed or at the time that curatives or other additives are mixed where dynamically vulcanized compositions are prepared. However, in a preferred embodiment, the hindered amine or phosphine material is fist compounded the BIMS polymer at temperatures up to 300° C. to provide a modified BIMS polymer of increased viscosity, and this modified polymer then blended with the thermoplastic resin and any other additives present in the TPE composition.

The thermoplastic composition of the invention results from the mixing of the amine or phosphine, the isoolefin copolymer, and the thermoplastic, in any order. In one embodiment, the copolymer is first mixed with the amine or phosphine to form an amine or phosphine/copolymer composition, followed by mixing with the thermoplastic. In another embodiment, the three components are mixed simultaneously. Further, the thermoplastic composition in one embodiment of the present invention is produced substantially in the absence of a solvent. More particularly, the amine and BIMS components are blended by techniques known to those skilled in the art without the addition of an organic solvent. Further, the amine or phosphine/copolymer composition thus formed may be mixed with the thermoplastic in the absence of a solvent. Solvents, especially organic solvents such as hexane, methylene chloride and other solvents known to dissolve polyolefins, nylons and halogenated elastomers, are substantially absent in the composition, or during blending of the components. By "substantially absent", it is meant that there is less than 5 wt % solvent by weight of the entire composition present.

The thermoplastic compositions of the invention may comprise from 10 to 90 wt % of the thermoplastic and from 90 to 10 wt % of the isoolefin copolymer. In another embodiment, the thermoplastic compositions of the invention may comprise from 20 to 80 wt % of the thermoplastic and from 80 to 20 wt % of the isoolefin copolymer. In another embodiment, the thermoplastic compositions of the invention comprise from 40 to 60 wt % of the thermoplastic, and from 60 to 40 wt % of the isoolefin copolymer. The vulcanized thermoplastic compositions have a tensile toughness of greater than 1000 psi in one embodiment, and greater than 2000 psi in another embodiment (ASTM D1708 as in text below). The vulcanized thermoplastic compositions have a strain at break value of greater than 200% in one embodiment, and greater than 300 % in another embodiment (ASTM D1708 as in text below).

EXAMPLES

The following examples are illustrative of the invention. Materials used in the examples are shown in Table 1.

Example 1

This example illustrates the breakdown in viscosity of brominated poly(isobutylene-co-p-methylstyrene) (identified as BIMS 1, 2 and 3 in Table 1). Samples of each rubber were subjected to shear rates from 50 to 5,000 $s^{-1}$ using a capillary rheometer at a temperature of 220° C. Viscosity data were subsequently corrected for entry pressure and non-Newtonian flow profile. Only viscosity values at 100, 500, 1000 and 1500 $s^{-1}$ are shown for comparison. Table 2 shows the drop off of viscosity as a function of increased rate of shear for each of these rubbers.

Example 2

All tertiary amines, DM16D, DMHTD and M2HT, were blended into BIMS 2 by a Brabender™ mixer running at 150° C. and at 60 rpm. Amine amounts were added in mole equivalents to the bromine content in BIMS. As shown in Table 3, by adding DM1 6D, viscosity values at all shear rates of BIMS at 220° C. could be raised.

The presence of tertiary amine of DM16D in BIMS does not lead to any thermal degradation in BIMS as demonstrated in Table 4. Viscosity values of DM16D-added BIMS at each temperature remain relatively unchanged during thermal cycling between 100 and 250° C.

The enhancement in viscosity value in tertiary-amine modified BIMS depends on the amine structure. By comparing the data in Table 5 with Table 3, hexadecyl-dimethylamine of DM16D provides more enhancement in viscosity as compared with that of DMHTD, which is dimethyl but with predominately $C_{18}$ $R_3$ group as compared with the $C_{16}$ $R_3$ group for DM16D. When M2HT, which is dihydrogenated tallowalkyl-methylamine and has both $R_2$ and $R_3$ groups as the alkyl group with predominantly $C_{18}$, is applied (see Table 6), the viscosity enhancement becomes less significant as compared with that provided by adding DM16D.

Example 3

A blend comprising 60 wt % of MFR 1.5 polypropylene (ExxonMobil PP4292) and 40 wt % of BIMS 2 modified with 0.5 mol equivalents of DM16D was prepared by mixing the components using a Brabender™ mixer at 80 RPM and 220° C. for a period of 5 minutes.

An otherwise identical control blend was prepared except the BIMS 2 was not amine modified (control). Morphologies of the resulting blends were examined by AFM (Atomic Force Microscopy) followed by image processing to determine dispersion sizes in terms of number average equivalent diameter. All specimens were analyzed within 8 hours after cryofacing to prevent specimen relaxation. During cryofacing, the specimens were cooled to −150° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vice for AFM analysis. The AFM measurements were performed in air on a NanoScope Dimension 3000 scanning probe microscope (Digital Instrument) using a rectangular Si cantilever. AFM phase images of all specimens were converted into a TIFF format and processed using PHOTOSHOP™ (Adobe Systems, Inc.). The image processing tool kit (Reindeer Games, Inc.) was applied for image measurements. Results of image measurements were written into a text file for subsequent data processing using EXCEL™. Results are shown in Table 7. These results demonstrate a nearly 30% reduction in size of the dispersed BIMS rubber compared with the control.

In the following examples, additional thermoplastic blends, or ionically linked alloy (ILA) compositions were prepared containing varying levels of tertiary amine and their mechanical properties were evaluated vs. control samples which contain no tertiary amine additive. The thermoplastic polymer used in these blends is polypropylene (PP) PP4722, a 2.8 MFR polypropylene available from ExxonMobil Chemical Co.

Example 4

The tertiary amine was diluted with a paraffinic mineral oil when added to the blend of thermoplastic and elastomer. Blends of PP/BIMS were prepared by mixing them in a Brabender mixer at a temperature of 190° C. and a rotor speed of 60 rpm. The PP pellets were first melted in the presence of a suitable stabilizer such as Irganox 1076. The elastomer followed by the oil-diluted Armeen DM16D was subsequently added. At the end, a metal oxide, e.g., MgO, was also added in the blend to act as an acid acceptor. Several ILA compositions with a thermoplastic/elastomer blend ratio of 40/60 are shown in Table 8 (numbers expressed in parts by weight). For inventive composition (b), an exact stoichiometric match in the bromine and amine groups was adopted, while in inventive compositions (a) and (c) more and less amine than bromine groups, respectively, are present.

Each ILA composition of Table 8 was compression-molded at 1900° for 15 minutes to make pads of thickness about 0.08 inch. Tensile stress-strain measurements were performed on these molded pads (stored under ambient conditions for 48 hours prior to tests). Micro-dumbbell specimens (ASTM D1708) were used (test temperature 25° C.; Instron cross-head speed 2 inch/min). As shown in Table 8 the incorporation of ionic associations in the PP/BIMS/oil blends (inventive examples (a) to (c) containing 10 phr oil) increases the strain at break, the maximum stress near the break point, and the tensile toughness (defined as the area under the stress-strain curve) significantly compared to the control example.

Example 5

Other ILA compositions with a thermoplastic/elastomer blend ratio of 30/70 are shown in Table 9 (numbers expressed in parts by weight). For inventive compositions (d) and (e) with 10 phr and 20 phr oil respectively, an exact stoichiometric match in the bromine and amine groups was adopted. Here, again it can be noted that incorporation of ionic associations in the PP/BIMS/oil blend (10 phr or 20 phr oil) increases the strain at break, the maximum stress near the break point, and the tensile toughness significantly compared to the controls.

In Table 10, ILA compositions with a thermoplastic/elastomer blend ratio of 30/70 using the higher Mooney BIMS are shown. In this series the oil level is also varied. For inventive compositions (f), (g) and (h), an exact stoichiometric match in the bromine and amine groups was adopted. The results indicate that the incorporation of ionic associations in the PP/BIMS/oil blend (10, 20 or 30 phr oil) increases the maximum stress near the break point and the tensile toughness over the control examples. At higher oil levels, the strain at break of the blend without ionic associations is higher than the corresponding blend with ionic associations perhaps due to the higher molecular weight of BIMS 2.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Materials Used

| Designation | Description | Material |
|---|---|---|
| BIMS 1 | BIMS rubber, Mooney viscosity of 35 units,* 0.75 mol % Br, 5 wt % PMS | EXXPRO™ 89-1 ExxonMobil Chemical |
| BIMS 2 | BIMS rubber, Mooney viscosity of 45 units,* 0.75 mol % Br, 5 wt % PMS | EXXPRO™ 89-4, ExxonMobil Chemical |
| BIMS 3 | BIMS rubber, Mooney viscosity of 65 units,* 1.1 mol % Br, 5 wt % PMS | EXXPRO™ 91-11, ExxonMobil Chemical |
| DM16D | Tertiary amine, hexadecyl-dimethylamine | Armeen DM16D, Akzo Nobel Chemical |
| DMHTD | Tertiary amine, hydrogenated tallowalkyl-dimethylamine** | Armeen DMTD, Akzo Nobel Chemical |
| M2HT | Tertiary amine, dihydrogenated tallowalkyl-methylamine | Armeen M2HT, Akzo Nobel Chemical |

*Mooney Viscosity measured at 125° C., ASTM D1646.
**Hydrogenated tallow contains saturated 3.5% $C_{14}$, 0.5% $C_{15}$, 31% $C_{16}$, 1% $C_{17}$, 61% $C_{18}$ and unsaturated 3% $C_{18}$ (2/3 of the alkyl group is $C_{18}$)

TABLE 2

Viscosity values of BIMS with low and high Mooney values.

| Shear Rate (1/s) | Viscosity* of BIMS 2 | Viscosity of BIMS 3 |
|---|---|---|
| 100 | 1274 | 1468 |
| 500 | 378 | 383 |
| 1000 | 200 | 197 |
| 1500 | 136 | 133 |

*Measured at 220° C. using a capillary rheometer. Values are in Pa-s.

TABLE 3

Viscosity values of DM16D-modified BIMS 2 at 220° C. in Pa-s.

| Shear Rate (1/s) | BIMS 2 | BIMS with 0.1 equiv. DM16D | BIMS with 0.25 equiv. DM16D | BIMS with 0.5 equiv. DM16D | BIMS with 1.0 equiv. DM16D |
|---|---|---|---|---|---|
| 100 | 1274 | 1673 | 1649 | 3304 | 2910 |
| 500 | 378 | 426 | 426 | 981 | 916 |
| 1000 | 200 | 230 | 239 | 571 | 505 |
| 1500 | 136 | 152 | 171 | 416 | 361 |

TABLE 4

Thermal stability of DM16D-modified BIMS 2 at 1 $s^{-1}$ shear rate measured using an oscillatory rheometer. Temperatures were ramped up from 100° C. to 250° C. and down to 100° C. and back up to 250° C. at 5° C./min.

| Temperature (° C.) | Viscosity* of BIMS with 0.25 equiv. DM16D | Viscosity of BIMS with 1.0 equiv. DM16D |
|---|---|---|
| 250 (first down) | 19770 | 124000 |
| 200 (first down) | 21089 | 124000 |
| 150 (first down) | 26387 | 117000 |
| 100 (first down) | 39526 | 111000 |
| 150 (second up) | 25862 | 111000 |
| 200 (second up) | 21600 | 125000 |
| 250 (second up) | 18909 | 131000 |

*values in Pa·s.

TABLE 5

Viscosity values of DMHTD-modified BIMS 2 at 220° C. in Pa-s.

| Shear Rate (1/s) | BIMS 2 | BIMS with 0.1 equiv. DMHTD | BIMS with 0.25 equiv. DMHTD | BIMS with 0.5 equiv. DMHTD | BIMS with 1.0 equiv. DMHTD |
|---|---|---|---|---|---|
| 100 | 1274 | 1892 | 1916 | 3209 | ...* |
| 500 | 378 | 517 | 594 | 861 | 963 |
| 1000 | 200 | 317 | 315 | 472 | 499 |
| 1500 | 136 | ...* | 211 | 312 | 339 |

*did not measure

TABLE 6

Viscosity values of M2HT-modified BIMS 2 at 220° C. in Pa-s.

| Shear Rate (1/s) | BIMS 2 | BIMS with 0.1 equiv. M2HT | BIMS with 0.25 equiv. M2HT | BIMS with 0.5 equiv. M2HT | BIMS with 1.0 equiv. M2HT |
|---|---|---|---|---|---|
| 100 | 1274 | N/C* | 1997 | 2372 | 2227 |
| 500 | 378 | N/C | 496 | 645 | 679 |
| 1000 | 200 | N/C | 263 | 368 | 388 |
| 1500 | 136 | N/C | 182 | 276 | 275 |

*N/C—No change from the pure BIMS 2.

TABLE 7

BIMS dispersion size

| Blend | Dispersion Size (micron) |
|---|---|
| Control | 2.08 |
| Modified BIMS | 1.42 |

TABLE 8

Copolymer blend with Polypropylene

| Component/property (parts by weight) | Control | (a) | (b) | (c) |
|---|---|---|---|---|
| PP 4772 | 18 | 18 | 18 | 18 |
| BIMS 1 | 27 | 27 | 27 | 27 |
| Armeen DM16D | — | 1.5 | 1.0 | 0.5 |
| Oil | 4.5 | 4.5 | 4.5 | 4.5 |
| Irganox 1076 | 0.09 | 0.09 | 0.09 | 0.09 |
| MgO (Maglite D) | 0.135 | 0.135 | 0.135 | 0.135 |
| 100% Modulus, psi | 570 | 950 | 830 | 720 |
| 200% Modulus, psi | — | 1170 | 1100 | 960 |
| Strain at break, % | 130 | 500 | 470 | 410 |
| Max. Stress near Break, psi | 580 | 1800 | 1600 | 1400 |
| Tensile Toughness, psi | 670 | 6240 | 2440 | 1850 |

TABLE 9

Copolymer blend with Polypropylene

| Component/property (parts by weight) | Control | Control | (d) | (e) |
|---|---|---|---|---|
| PP 4772 | 13.5 | 13.5 | 13.5 | 13.5 |
| BIMS 1 | 31.5 | 31.5 | 31.5 | 31.5 |
| Armeen DM16D | — | — | 1.16 | 1.16 |
| Oil | 4.5 | 9.0 | 4.5 | 9.0 |
| Irganox 1076 | 0.09 | 0.09 | 0.09 | 0.09 |
| MgO (Maglite D) | 0.135 | 0.135 | 0.135 | 0.135 |
| 100% Modulus, psi | 100 | 75 | 440 | 280 |
| 200% Modulus, psi | 70 | 24 | 660 | 460 |
| Strain at Break, % | 570 | 350 | 640 | 680 |
| Max. Stress near Break, psi | 8 | 3 | 1380 | 1100 |
| Tensile Toughness, psi | 270 | 120 | 5470 | 4430 |

TABLE 10

Copolymer blend with Polypropylene

| Component/property (parts by weight) | Control | Control | Control | (f) | (g) | (e) |
|---|---|---|---|---|---|---|
| PP 4772 | 13.5 | 13.5 | 13.5 | 13.5 | 13.5 | 13.5 |
| BIMS 2 | 31.5 | 31.5 | 31.5 | 31.5 | 31.5 | 31.5 |
| Armeen DM16D | — | — | — | 1.16 | 1.16 | 1.16 |
| Oil | 4.5 | 9.0 | 13.5 | 4.5 | 9.0 | 13.5 |
| Irganox 1076 | 0.09 | 0.09 | 0.09 | 0.09 | 0.09 | 0.09 |
| MgO (Maglite D) | 0.135 | 0.135 | 0.135 | 0.135 | 0.135 | 0.135 |
| 100% Modulus, psi | 180 | 130 | 36 | 550 | 320 | 440 |
| 200% Modulus, psi | 160 | 100 | 26 | 830 | 510 | 630 |
| Strain at Break,% | 650 | 920 | 1280 | 710 | 710 | 600 |
| Max. Stress near Break, psi | 35 | 3 | 0.2 | 1900 | 1230 | 1200 |
| Tensile Toughness, psi | 730 | 450 | 110 | 8100 | 5200 | 4500 |

We claim:

1. A composition comprising: at least one isoolefin copolymer comprising a halomethylstyrene derived unit mixed with at least one hindered amine or phosphine compound having the respective structure $R_1 R_2 R_3 N$ or $R_1 R_2 R_3 P$ wherein $R_1$ is H or $C_1$ to $C_6$ alkyl, $R_2$ is $C_1$ to $C_{30}$ alkyl and $R_3$ is $C_4$ to $C_{30}$ alkyl and further wherein $R_3$ is a higher alkyl than $R_1$, the mixing being accomplished at a temperature above the melting point of said hindered amine or phosphine compound; wherein the composition has a viscosity greater than 1300 Pa·s at 220° C. and 100 1/s shear rate or greater than 200 Pa·s at 220° C. and 1000 1/s shear rate (as measured by ASTM D1646).

2. The composition of claim 1, wherein $R_3$ is $C_{10}$ to $C_{20}$ alkyl.

3. The composition of claim 1, wherein said hindered compound is a tertiary amine and wherein $R_3$ is $C_{10}$ to $C_{20}$ alkyl.

4. The composition of claim 3, wherein $R_1$ and $R_2$ are each methyl.

5. The composition of claim 1, containing from 0.05 to 2 moles of amine or phosphine per halogen.

6. The composition of claim 1, wherein the isoolefin copolymer is a halogenated poly(isobutylene-co-p-methylstyrene).

7. The composition of claim 1, wherein a solvent is substantially absent in the mixing of the isoolefin copolymer and amine or phosphine.

8. The composition of claim 7, wherein said hindered compound is a hindered amine wherein $R_3$ is $C_{10}$ to $C_{20}$ alkyl and $R_1$ and $R_2$ are each methyl.

9. The composition of claim 1, wherein the viscosity value of the amine or phosphine/copolymer composition is greater than 200 Pa·s at 220° C. and 1000 1/s shear rate (as measured by ASTM D1646).

10. The composition of claim 7, wherein said copolymer contains from 0.05 to 2 moles of amine or phosphine per halogen.

11. A process for increasing the viscosity of at least one isoolefin copolymer comprising a halomethylstyrene derived unit comprising mixing the at least one copolymer with at least one hindered amine or phosphine compound having the respective structure $R_1 R_2 R_3 N$ or $R_1 R_2 R_3 P$ wherein $R_1$ is H or $C_1$ to $C_6$ alkyl, $R_2$ is $C_1$ to $C_{30}$ alkyl, and $R_3$ is $C_4$ to $C_{30}$ alkyl and further wherein $R_3$ is a higher alkyl than $R_1$, to form an amine or phosphine/copolymer composition, and wherein the mixing is accomplished at a temperature above the melting point of said hindered amine or phosphine compound, and recovering a composition having a viscosity greater than 1300 Pa·s at 220° C. and 100 1/s shear rate or greater than 200 Pa·s at 220° C. and 1000 1/s shear rate (as measured by ASTM D1646).

12. The process of claim 11, wherein $R_3$ is $C_{10}$ to $C_{20}$ alkyl.

13. The process of claim 11, wherein said hindered compound is a tertiary amine.

14. The process of claim 11, wherein $R_1$ and $R_2$ are each methyl.

15. The process of claim 11, wherein said copolymer contains from 0.05 to 2 moles of amine or phosphine per halogen.

16. The process of claim 11, wherein a solvent is substantially absent.

17. The process of claim 11, wherein the isoolefin copolymer is a halogenated poly(isobutylene-co-p-methylstyrene).

18. A composition produced by the process of claim 12.

19. The composition of claim 18, wherein the viscosity value of the amine or phosphine/copolymer composition is from 1300 to 6000 Pa·s at 220° C. and 100 l/s shear rate (as measured by ASTM D1646).

20. The composition of claim 18, wherein the viscosity value of the amine or phosphine/copolymer composition is greater than 200 Pa·s at 220° C. and 1000 l/s shear rate (as measured by ASTM D1646).

* * * * *